(12) United States Patent
Martino et al.

(10) Patent No.: US 8,116,338 B2
(45) Date of Patent: Feb. 14, 2012

(54) METHOD FOR REDUCING ERRORS WHILE TRANSFERRING TOKENS TO AND FROM PEOPLE

(75) Inventors: Jacquelyn A. Martino, Cold Spring, NY (US); John Frederick Morar, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 12/465,997

(22) Filed: May 14, 2009

(65) Prior Publication Data
US 2010/0290482 A1 Nov. 18, 2010

(51) Int. Cl.
*H04L 12/403* (2006.01)
(52) U.S. Cl. ....................................................... 370/450
(58) Field of Classification Search .................. 370/468, 370/452, 450; 706/45; 341/50
See application file for complete search history.

(56) References Cited

U.S. PATENT DOCUMENTS
7,646,317 B2 * 1/2010 Chen .............................. 341/50

OTHER PUBLICATIONS

Belongie, et al., "Matching Shapes", Eighth IEEE International Conference on Computer Vision (Jul. 2001).
Veltkamp, et al., "State-of-the-Art in Shape Matching", Principles of Visual Information Retrieval, (2001).
International Code of Signals for Visual, Sound, and Radio Communications, United States Edition, Revised 2003.

* cited by examiner

*Primary Examiner* — Ricky Ngo
*Assistant Examiner* — Chandrahas Patel
(74) *Attorney, Agent, or Firm* — Scully, Scott, Murphy & Presser, P.C.; Daniel P. Morris, Esq.

(57) ABSTRACT

A system, method and computer program produce for handling and minimizing miscommunication and transformation of tokens that are processed by humans, either verbally or in writing, during some part of a usage scenario. This is accomplished by filtering out confusing tokens, as determined by calculating a distance metric for each token. A distance metric may be calculated along a print modality, a visual modality or a verbal modality.

19 Claims, 5 Drawing Sheets

| ELEMENTS TO BE MAPPED | MAPPED-TO TEXT ELEMENT BASED ON SIMILAR SOUNDS WHEN SPOKEN OR WRITTEN |
|---|---|
| ATE | 8 |
| EIGHT | 8 |
| EH | A |
| ACTS | AX |
| AD | ADD |
| ACT | AX |
| ADDS | ADS |
| ADZE | ADS |
| AFFECT | EFFECT |
| l (LOWERCASE LETTER L) | 1 (NUMERAL ONE) |
| o (LOWERCASE LETTER O) | 0 (NUMERAL 0) |
| EL (SPOKEN L) | 1 (NUMERAL ONE) |
| OH (SPOKEN O) | 0 (NUMERAL 0) |
| DAYS | DAZE |
| ... | |

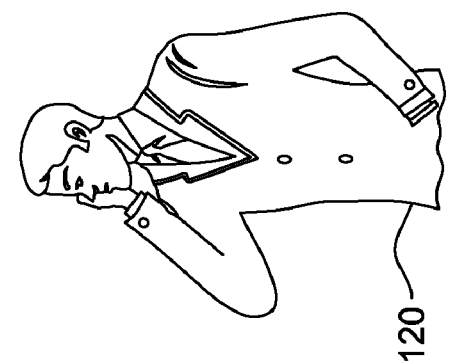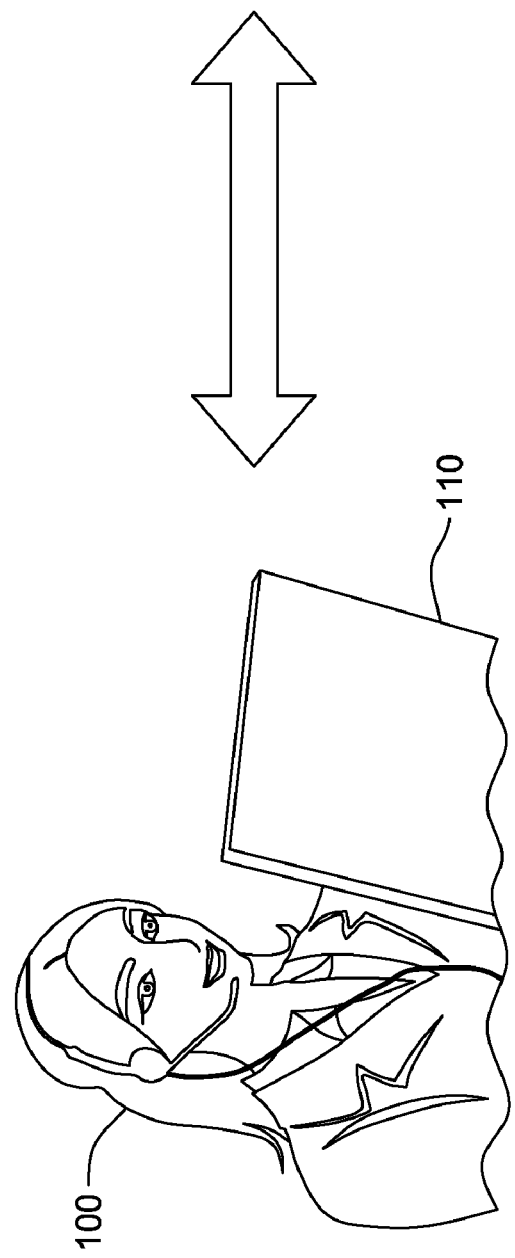
FIG. 1

| ELEMENTS TO BE MAPPED | MAPPED-TO TEXT ELEMENT BASED ON SIMILAR SOUNDS WHEN SPOKEN OR WRITTEN |
|---|---|
| ATE | 8 |
| EIGHT | 8 |
| EH | A |
| ACTS | AX |
| AD | ADD |
| ACT | AX |
| ADDS | ADS |
| ADZE | ADS |
| AFFECT | EFFECT |
| l (LOWERCASE LETTER L) | 1 (NUMERAL ONE) |
| o (LOWERCASE LETTER O) | 0 (NUMERAL 0) |
| EL (SPOKEN L) | 1 (NUMERAL ONE) |
| OH (SPOKEN O) | 0 (NUMERAL 0) |
| DAYS | DAZE |
| ... | |

FIG. 3

| GRANTED SPOKEN TOKENS (AFTER SPEECH TO TEXT CONVERSION AND TRANSLATION TO LOWER CASE) | GRANTED TEXT TOKENS | COMPARISON FORM |
|---|---|---|
| VEGETARIAN DELIGHT | | VEGETARIAN DELIGHT |
| EIGHT ACTS | | 8 AX |
| EIGHT DAYS | | 8 DAZE |
| | 7982 | 7982 |
| | SOME DAY | SUM DAY |
| ... | ... | ... |

FIG. 4

| LEVEL OF MATCH OF TOKENS IN THE COMPARISON FORM | ASSIGNED DISTANCE METRIC |
|---|---|
| ELEMENTS MATCH EXACTLY | 0 |
| SAME ELEMENTS DIFFERENT ORDER | 1 |
| NUMBER OF ELEMENTS IS DIFFERENT - AND REQUESTED TOKEN ELEMENTS FORM A PROPER ORDERED SUBSET OF EXISTING TOKEN | 3 |
| NUMBER OF ELEMENTS IS DIFFERENT - AND EXISTING TOKEN ELEMENTS FORM A PROPER ORDERED SUBSET OF REQUESTED TOKEN | 3 |
| NUMBER OF ELEMENTS IS DIFFERENT - AND EXISTING TOKEN ELEMENTS FORM A PROPER UN-ORDERED SUBSET OF REQUESTED TOKEN | 4 |
| NUMBER OF ELEMENTS IS DIFFERENT - AND REQUESTED TOKEN ELEMENTS FORM A PROPER ORDERED SUBSET OF EXISTING TOKEN | 4 |
| NUMBER OF ELEMENTS IS SAME AND ALL BUT ONE ELEMENT MATCH AN ASSIGNED TOKEN | 5 |
| NUMBER OF ELEMENTS IS SAME AND ALL BUT TWO ELEMENTS MATCH AN ASSIGNED TOKEN | 6 |
| NO ELEMENTS OF THE REQUESTED TOKEN MATCH ANY ELEMENT OF AN EXISTING TOKEN | 17 |
| NO ELEMENTS OF THE REQUESTED TOKEN MATCH ANY ELEMENT OF AN EXISTING TOKEN AND THE NUMBER OF ELEMENTS IS GREATER THAN OR EQUAL TO 3 | 25 |
| ... | ... |

FIG. 5

METHOD FOR REDUCING ERRORS WHILE TRANSFERRING TOKENS TO AND FROM PEOPLE

FIELD OF THE INVENTION

The present invention relates to the generation and communication of tokens, particularly tokens that are retained by humans and communicated to other humans.

BACKGROUND OF THE INVENTION

Frequently, when humans interact with systems, processes and/or organizations intermittently, they interact on a recurring basis. Although such interactions are separated in time, they are often part of a long running transaction made up of several connected interactions. For instance, a person may join a discount club and get a membership token (e.g. a membership number) that is a required element in every purchase. There are many examples of using tokens for identification, entitlement, or associating a token holder with a transaction. Another common example is when a customer contacts a service agent for support. In most cases the service agent will provide the customer with one or more tokens to be used in future interactions which refer back to the original request for service. Similarly, tokens are widely used in the computer industry to correlate activities that are completed in multiple units of work that need to be associated with each other (e.g. Return Authorization Numbers used when a consumer wishes to return or service computer parts). Many of the generated tokens are directly exposed to humans.

There are many challenges associated with the generation and use of tokens when communicated by humans using, for example, verbal or written communication. For example, when a customer calls a service agent on the phone, the service agent may verbally communicate a token to the customer. In most cases, the customer will need this token to successfully complete future interactions, and therefore retains the token in some manner. To retain the token, the customer may rely on one or more of: memorization, audio recording, hand-written transcript, typed transcript, or even depend on someone else to persist the token.

One common failure mode for scenarios that involve the transfer of tokens from (or to) a user is inadvertent transformation of the token. For instance, a verbally transferred token may be miscommunicated when it contains a combination of upper and lower case characters. In addition, verbal transmission of tokens involving words are subject to substitution errors involving similar sounding words (e.g. when two or more words are homonyms with respect to each other). When tokens are typed, or written, the shapes of the symbols are also subject to misinterpretation; for instance, the difference between the numeral one and the lower case letter "L" are indistinguishable in some people's handwriting, as well as in some printed fonts.

Numerous mechanisms have evolved to minimize the occurrence of such harmful transformations. For instance, the NATO Phonetic alphabet (Allied Tactical Publication ATP-1, Volume II: *Allied Maritime Signal and Maneuvering Book*, NATO, 1983) uses a well distinguished word to represent each letter of a token. In addition, some printed fonts and styles of hand writing represent each character uniquely; for example, placing a slash through a numeral zero in order to distinguish it from a capital letter "O" when typed or handwritten.

These mechanisms, however, fail to uniformly address verbal and written communication. For example, the NATA Phonetic alphabet addresses written communication, but not verbal communication. In addition, many of these mechanisms rely on an alphabet that may be unfamiliar to a customer.

BRIEF SUMMARY OF THE INVENTION

The present invention is directed to a novel system and method to minimize miscommunication and transformation of tokens that are processed by humans during some part of a usage scenario. In particular, the embodiments described provide for the generation and use of tokens that will possibly be viewed, spoken or written as part of a usage scenario. Examples of such tokens include: account tokens, part tokens, model tokens and service request tokens, where a token could be an alphanumeric, phonic, pictorial or any other representation that will need to be communicated. In addition, the embodiments described below minimize the miscommunication and transformation of a received token that has been verbally communicated.

Therefore, one aspect of the present invention provides a computer-implemented method for filtering ambiguous tokens, comprising:

receiving, from a computing device, a token previously communicated or generated according to a communication modality;

calculating a distance metric value for the received token, where the distance metric value represents a comparative distinction of the received token according to a modality type;

comparing the calculated distance metric with a predetermined ambiguity threshold value; and outputting token data including the received token when the distance metric value calculated is at least as great as the ambiguity threshold; otherwise, outputting the token data including a partial received token corresponding to a portion of the received token that is at least as great as the ambiguity threshold.

Another aspect of the present invention provides a token processing device for filtering ambiguous tokens, comprising:

means, implemented by a computing device, for receiving a token;

means for calculating a distance metric for the received token, where the distance metric calculates a comparative distinction of the received token according to a modality type;

means for comparing the calculated distance metric with a predetermined ambiguity threshold; and means for outputting token data to at least one of a storage unit and a display device, where the token data includes the received token when the distance metric is at least as great as the ambiguity threshold, otherwise the token data includes a partial received token corresponding to a portion of the received token that is at least as great as the ambiguity threshold.

Yet another aspect of the present invention provides a computer-readable storage medium storing instructions executable by a computing device to adapt said computing device to perform a method for filtering ambiguous tokens, said method comprising:

receiving, from a computing device, a token previously communicated or generated according to a communication modality;

calculating a distance metric for the received token, where the distance metric value represents a comparative distinction of the received token according to a modality type;

comparing the calculated distance metric with a predetermined ambiguity threshold value; and outputting token data including the received token when the distance metric value evaluated is at least as great as the ambiguity threshold; otherwise, outputting the token data including a partial received token corresponding to a portion of the received token that is at least as great as the ambiguity threshold.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed descriptions of illustrative embodiments when read in conjunction with the accompanying drawings, wherein:

FIG. 1 is a schematic illustration of an exemplary usage environment according to one embodiment of the present invention, FIG. 3 illustrates an partial translation table, according to one embodiment of the present invention.

FIG. 4 illustrates a partial heuristics table, according to one embodiment of the present invention.

FIG. 5 illustrates a partial table mapping tokens to distance metric values.

DETAILED DESCRIPTION OF THE INVENTION

FIG. 1 is a schematic illustration of an exemplary usage scenario according to one embodiment of the present invention. In the example shown in FIG. 1, Telephone Operator 100 receives incoming phone calls from customers and operates a computing system 110. Customer 120 is a customer who has been connected to and is speaking with Telephone Operator 100. While not shown in FIG. 1, Customer 120 has verbally communicated a token to Telephone Operator 100 during the course of their conversation. According to one embodiment of the present invention, the token verbally passed between Customer 120 and Telephone Operator 100 may be used for identification, entitlement, or associating a Customer 120 with a transaction. In an alternative embodiment of the present invention, Customer 120 contacts a Telephone Operator 100 for support. In the alternative embodiment, Telephone Operator 100 verbally provides Customer 120 with one or more tokens for future use.

Figure 2:
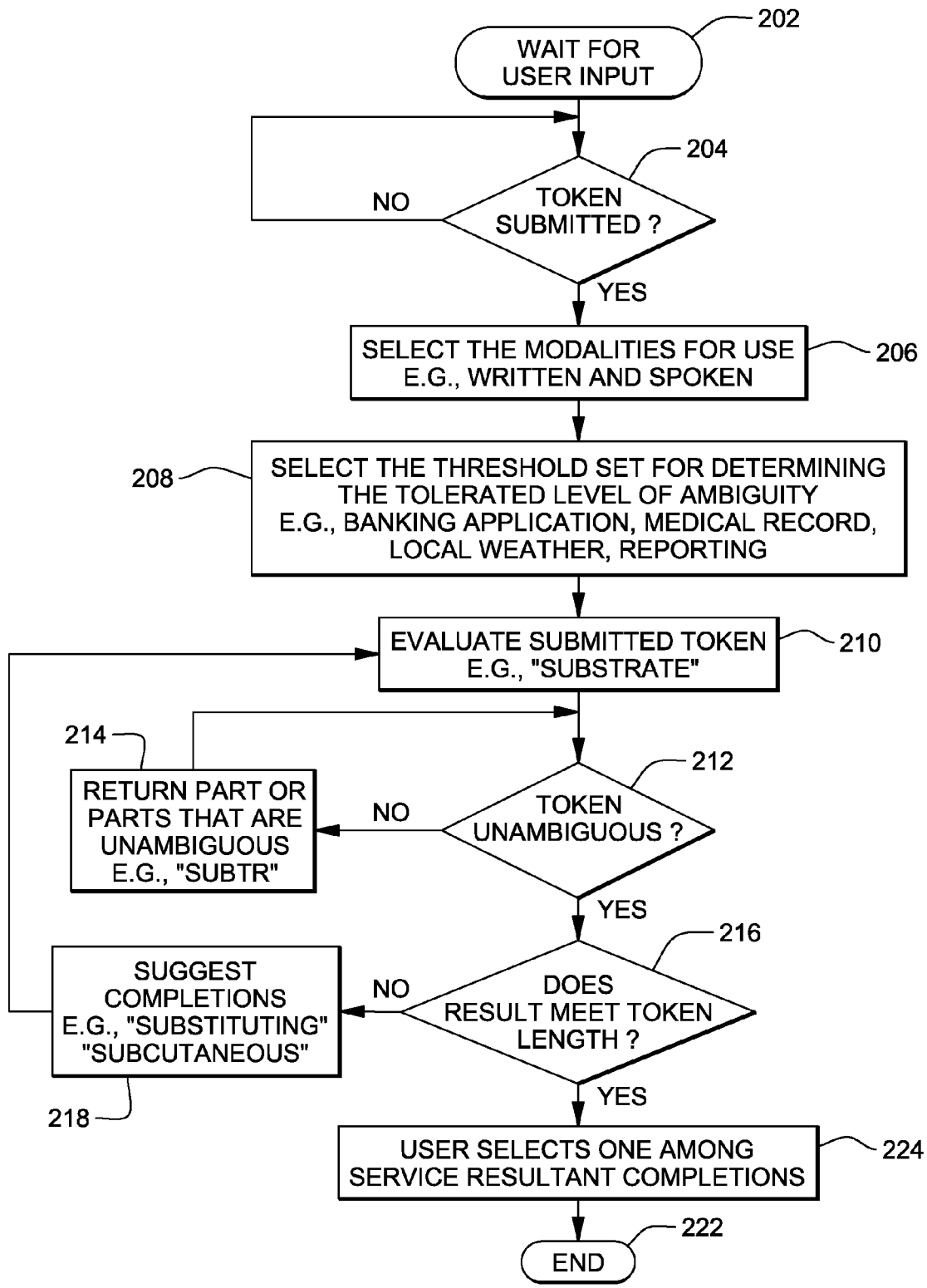
FIG. 2 is a flow chart illustrating one embodiment of the present invention.

FIG. 2 is a flow chart describing the method for reducing errors associated with transferring tokens between people, as illustrated, for example, in FIG. 1, according to one embodiment of die present invention. In particular, according to one embodiment of the present invention, system 110 described in FIG. 1 executes computer instructions that direct system 110 to perform the process illustrated in FIG. 2. Consequently, at step 202, system 110 waits for user input, which may occur via any of the input devices described below in FIG. 3. Upon receiving user input, system 110 determines, at step 204, whether a token has been submitted, and if not, the system returns to an idle state to wait for additional user input.

Upon determining, at step 204, that a token was submitted, system 110 selects a modality of use in step 206. Step 206 illustrates two example modalities of use: i.e., either written or spoken. In addition, these modalities of use might be further subdivided: e.g., the spoken modality could be further divided to include different languages or dialects spoken by humans, perhaps within a specific region. Those skilled in the art, however, would recognize that other modalities of use are possible. Moreover, system 110 might have the modality of use predetermined or it might prompt the user to select a modality of use via a user interface displayed on a computing device.

In step 208, system 110 sets a "tolerated" ambiguity threshold, where the ambiguity threshold is numerical value corresponding to a desired distance metric (described in further detail below). The ambiguity threshold value is used to filter undesirable tokens, so that token which may be confusing for more than one modality (e.g., written and spoken) will not be considered "valid" tokens because such tokens would be deemed confusing by the distance metric value calculated for the token and the ambiguity threshold designed to filter confusing tokens. Furthermore, according to one embodiment of the present invention, different ambiguity threshold levels might be defined. For example, step 208 illustrates three possible ambiguity thresholds labeled according to each threshold's intended usage. For example, "banking application" label might have the highest ambiguity threshold, the "medical record" label would not set the ambiguity threshold as high as the "banking application" threshold and the "local weather reporting" would have the lowest ambiguity threshold. Those skilled in the art, however, would recognize that other labels and threshold values are possible. In addition, according to one embodiment of the present invention, system 110 might have the ambiguity threshold predetermined or it may prompt the user to select the ambiguity threshold via a user interface displayed on a computing device.

Next, system 110 evaluates the submitted token in step 210 by calculating a distance metric and uses the distance metric to determine whether the submitted token was ambiguous in step 212. The distance metric is a positive numeric value, where a lower value is less discernable to a higher value, and the distance metric is calculated based on the submitted token and is used to describe the comparative distinction of the submitted token vis-à-vis other tokens across modality types. A modality provides the basis to evaluate the token and may include at least one of viewed, written or spoken modalities. Moreover, each modality type might be further defined; e.g., the spoken modality might include different languages spoken by humans according to a geographic region. In addition, the distance metric could be calculated based on any number of techniques known to those skilled in the art. For example, when evaluating printed text, the techniques described by Belongie, et al. "Matching Shapes", Eighth IEEE International Conference on Computer Vision (July 2001), might be used (see generally, Veltkamp, et al., "State-of-the-Art in Shape Matching", Principles of Visual Information Retrieval, (2001)).

Since calculating the distance metric could take a considerable amount of time on a processing device of computer system 110, an alternative embodiment of the present invention uses heuristic combinations to improve the efficiency of the present invention on the processing device. A heuristic combination is a token/distance metric pair that has been pre-calculated and stored on a storage device. Preferably, the heuristic combinations are stored in a persistent storage device, e.g., a heuristic combinations table, which has been indexed for efficient comparisons between the submitted token and the stored heuristic combinations. Thus, when evaluating the submitted token in step 210, system 110 would compare the submitted token, and portions thereof, against the tokens stored in the heuristic combinations table and retrieve the distance metric upon a match.

The values stored in the heuristic combinations table, according to one embodiment of the present invention, may represent troublesome tokens that frequently appear in a particular modality type. For example, as previously mentioned, the numeral one and the lower case letter L appear identical in some fonts; consequently a token for the numeral one and a token for the lower case of the letter L would be stored in the heuristic combinations table with a low distance metric value for each entry. In general, according to one embodiment of the present invention, heuristic combinations are stored in the heuristic combinations table when the calculated distance metric is below a defined heuristic threshold value, thereby indicating the evaluated token is poorly discernable from other tokens along a particular modality type.

According to another embodiment of the present invention, the defined heuristic threshold might be set to a negative value to indicate that every distance metric is to be stored in the heuristic combinations table. Thus, according to this alternative embodiment of using heuristic combinations, the heuristic combinations table operates as a cache of calculated distance metrics and disregards the calculated value of the distance metric. Further, according to yet another embodiment of the heuristic combinations table, a value indicating the maximum table size value may be defined to limit the size of the heuristic combinations table. As discussed above, the table size might, for example, be defined by the physical storage required to store the table (e.g., 50 megabytes) or might defined as a window of time to store the calculated distance metrics (e.g., every distance metric calculated within the past six months). Those skilled in the art would recognize other possible configurations for the heuristic combinations table, and will not be further discussed herein.

When system 110 determines that part(s) of the token is ambiguous, system 110 removes the parts deemed to be ambiguous and system 110 returns to step 212 to determine if the remaining portion of the submitted token is ambiguous.

Once step 212 has determined that the input token (either the submitted token or a portion thereof) is unambiguous, system 110 next compares the input token to a required token length value to determine whether the token is acceptable. If the input token to step 212 was not the required token length, system 110 suggests completions to the input token that are at least as great as the required token length, where the token length is a numeral value determined by the security requirements of the usage scenario for the token. For example, as shown in FIG. 2, step 210 evaluates the token "substrate" and determines that the sub-string 'substr" is unambiguous in step 214. In particular, the substring "ate" is confusing with the numeral "8" along the spoken modality in the English language. System 110 determines, at step 216, whether the sub-string "substr" meets the required length. If system 110 determines that the sub-string "substr" does not meet the required length, at 218, system 110 suggests "substituting" and "subcutaneous" as possible alternatives.

When the token does meet the required token length, system 110 outputs the token to a display device and/or a storage unit, for user access, as discussed in further detail below. By outputting the token, system 110 allows the user to use the token in an acceptable way. For example, if the user was creating a new account and the token is to be used by the user as a password, system 110 will store the submitted token as the password for the user. In an alternative embodiment, the user is inputting the token into system 110 after listening to a customer speaking the token and step 224 will allow the user to access the customer's account. At step 222, system 110 completes the execution of the process illustrated in FIG. 2.

FIG. 3 illustrates a partial translation table according to one embodiment of the present invention. The translation table shown in FIG. 3 is used to translate tokens from one modality to another. For example, when the supplied token is in the verbal (or "speech") modality, a text modality may be compared using the entries in FIG. 3. Moreover, the spoken token may be normalized by transforming what has been spoken to a text representation by using a speech-to-text converter. In addition, as shown in FIG. 3, a comparison form of the token is created by applying the transformations in FIG. 3 to each element of the token. Thus, for example, the token "eight acts" would have a comparison form of "8 ax" according to FIG. 3.

FIG. 4 illustrates a partial heuristics table according to one embodiment of the present invention. By searching through the heuristics table (e.g., previously assigned tokens) for various levels of match (as described below), a distance metric value is assigned to tokens based on the level of match within the heuristics table. Thus, if the distance metric for the supplied token is above a predetermined ambiguity threshold (which is a measure of tolerable confusion between tokens for a particular application of the application of a token), then the supplied token would be accepted as an assigned token. In addition, according to one embodiment of the present invention, the supplied token would then be added to the heuristics table illustrated in FIG. 4 for use in subsequent comparisons when calculating distance metric values of subsequent tokens.

In one embodiment of the present invention, assigning a distance metric is accomplished by building a distance metric table, which assigns a distance value to a level of comparison, as shown in FIG. 5. FIG. 5 illustrates example criterion for assigning distance metrics to levels of match across various modalities. Thus, FIG. 5 illustrates one embodiment for matching similarities between different modalities for a given token could be used to provide a variable scale of ambiguity. For example, if the spoken form of a token is an exact match with the text form of another token, as illustrated in FIG. 3 with the word "ate" and the numeral eight, for example, a distance metric of 0 is assigned. Assigning a distance metric value of 0, according to one embodiment of the present invention, would guarantee rejection of the requested token as not being sufficiently differentiated from an existing token even though the tokens may not match in their native modality. Thus, if the token "eight act play" was already accepted, then in this formulation the tokens "8 act play", "ate ax play", "ate act play" would match exactly and be rejected—since each of these formulations would constitute an exact match across the illustrated verbal and text modalities in FIG. 3 and hence be assigned a distance metric value of 0.

Other permutations to the example above are possible, as further shown in FIG. 5. For example, when elements of the requested token were all present in an existing token, but in a different order, a distance metric value of 1 could be assigned—indicating a small degree of separation. Furthermore, when the elements of the requested token formed a proper ordered subset of an existing token then a value of 3 could be assigned as a distance metric. If the elements of the requested token formed an unordered subset of an existing token then a value of 4 could be assigned as a distance metric, and so-on.

In addition to the ambiguity threshold discussed above, different levels of token ambiguity could be accepted—depending on the usage scenario of the token. For instance, with a distance metric table populated as shown in FIG. 5, if the threshold were set to be greater or equal to one, both "8 acts" and "act eight" would be legal tokens, however, if the threshold was set to be greater or equal to 2 then only one of ("8 acts" and "act eight") would be accepted as a token. Similarly, the spoken token "el" and the spoken token "1" would not both be allowed as tokens in this example distance metric since they would be translated to the same comparison form. In this example, these tokens were placed in the table illustrated in FIG. 3 because they are ambiguous with respect to their written or typed modality.

The examples discussed above for assigning distance metric values illustrates the concepts of matching along two modalities only and are not to be viewed as limiting, in any way, the invention disclosed herein. Furthermore, although two modalities have been discussed in the examples able, one skilled in the art could trivially, and without undue experimentation, be extended to defining metrics across three or more modalities.

Figure 6:
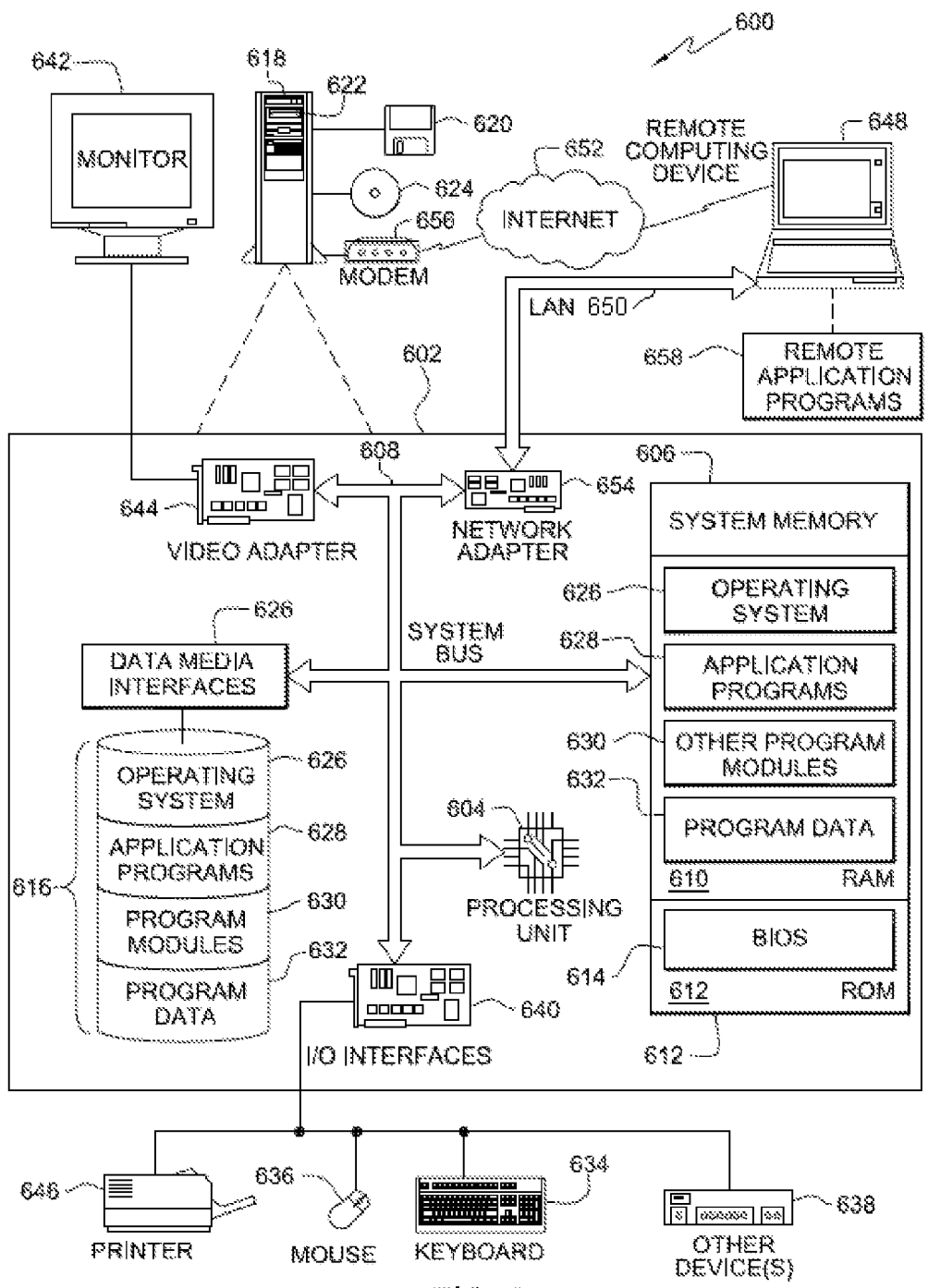
FIG. 6 is a schematic illustration of a system according to one embodiment of the present invention.

FIG. 6 illustrates a general computer environment 600 that is one example of computing system 110, described above. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

Computer environment 600 includes a general-purpose computing device in the form of a computer 602. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Both the LAN and WAN form logical connections via wired communication mediums and appropriate communication protocols (such as Ethernet, see e.g., IEEE 802.3-1998 Std) or wireless communication mediums and appropriate communications protocols (such as Wi-Fi, see e.g., IEEE 802.11-2007 Std). Such networking environments are commonplace in homes, offices, enterprise-wide computer networks, intranets, and the Internet.

When implemented in a LAN networking environment the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

As will be readily apparent to those skilled in die art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computer-implemented method for filtering ambiguous tokens, comprising:
storing, in a memory storage device, heuristic combinations, where each stored heuristic combination includes pre-calculated tokens and respective distance metrics, the heuristic combinations being below a pre-determined heuristic threshold;
receiving, from a computing device, a current token previously communicated or generated according to a communication modality;
calculating a distance metric value for the received current token, where the distance metric value represents a comparative distinction of the received current token according to a modality type;
comparing the received current token with the stored heuristic combinations to determine a heuristic match, the heuristic match representing that the received current token includes one or more of the stored heuristic combinations, wherein the comparing the received current token with the stored heuristic combinations includes comparing the calculated distance metric with the pre-determined heuristic threshold;
outputting the received current token if the calculated distance metric value is larger than or equal to the pre-determined heuristic threshold;
removing the determined heuristic match from the received current token, if the calculated distance metric is less than the pre-determined heuristic threshold, wherein the heuristic match includes the received current token, or portions thereof, corresponding to at least one of the stored heuristic combinations; and
outputting a portion of the received current token that is larger than or equal to the pre-determined heuristic threshold after removing the heuristic match from the received token.

2. The method according to claim 1, wherein the received current token is evaluated along at least one of a print modality, a visual modality and a spoken modality to determine the calculated distance metric value.

3. The method according to claim 1, wherein the received current token is automatically generated.

4. The method according to claim 1, wherein the storing comprises:

storing, at a storage device, first heuristic combinations, where each first heuristic combination includes first pre-calculated tokens and respective distance metrics, the first heuristic combinations exceeding the pre-determined heuristic threshold;

wherein the outputting comprises:
one of:
outputting the received current token when the received current token fully matches with one of the first pre-calculated tokens;
outputting a portion of the received current token when the portion of the received current token fully matches with one of the first pre-calculated tokens.

5. The method according to claim 1, wherein the pre-determined heuristic threshold is set to a negative value.

6. The method according to claim 1, further comprising selecting a modality of use.

7. The method according to claim 6, wherein the modality of use includes at least one of a written use and a spoken use.

8. The method according to claim 7, where the spoken use includes more than one spoken language.

9. The method according to claim 1, wherein the calculated distance metric value of the outputted current token exceeds or is equal to the pre-determined heuristic threshold.

10. A token processing device for filtering ambiguous tokens, comprising:
a memory device;
a processor connected to the memory device,
wherein the processor is configured to:
store, in the memory device, heuristic combinations, where each stored heuristic combination includes pre-calculated tokens and respective distance metrics, below a pre-determined heuristic threshold;
receive a current token previously communicated or generated according to a communication modality;
calculate a distance metric value for the received current token, where the distance metric value represents a comparative distinction of the received current token according to a modality type;
compare the received current token with the stored heuristic combinations to determine a heuristic match, the heuristic match representing that the received current token includes one or more of the stored heuristic combinations, wherein the compare the received current token with the stored heuristic combinations includes comparing the calculated distance metric with the pre-determined heuristic threshold;
output the received current token if the calculated distance metric value is larger than or equal to the pre-determined heuristic threshold;
remove the determined heuristic match from the received token, if the calculated distance metric is less than the pre-determined heuristic threshold, wherein the heuristic match includes the received current token, or portions thereof, corresponding to at least one of the stored heuristic combinations; and
output a portion of the received current token that is larger than or equal to the pre-determined heuristic threshold after removing the heuristic match from the received token.

11. The token processing device according to claim 10, wherein the received current token is automatically generated.

12. The token processing device according to claim 10, wherein the received current token is evaluated along at least one of a print modality, a visual modality and a spoken modality to determine the calculated distance metric value.

13. The token processing device according to claim 10, wherein the pre-determined heuristic threshold is set to a negative value.

14. The token processing device according to claim 10, wherein the processor is further configured to select a modality of use.

15. The token processing device according to claim 14, wherein the modality of use includes at least one of a written use and a spoken use.

16. The token processing device according to claim 15, where the spoken use includes more than one spoken language.

17. A non-transitory computer-readable storage medium storing instructions executable by a computing device to adapt said computing device to perform a method for filtering ambiguous tokens, said method comprising:
storing, in a memory storage device, heuristic combinations, where each stored heuristic combination includes pre-calculated tokens and respective distance metrics, the heuristic combinations being below a pre-determined heuristic threshold;
receiving, from a computing device, a current token previously communicated or generated according to a communication modality;
calculating a distance metric value for the received current token, where the distance metric value represents a comparative distinction of the received current token according to a modality type;
comparing the received current token with the stored heuristic combinations to determine a heuristic match, the heuristic match representing that the received current token includes one or more of the stored heuristic combinations, wherein the comparing the received current token with the stored heuristic combinations includes comparing the calculated distance metric with the pre-determined heuristic threshold;
outputting the received current token if the calculated distance metric value is larger than or equal to the pre-determined heuristic threshold;
removing the determined heuristic match from the received current token, if the calculated distance metric is less than the pre-determined heuristic threshold, wherein the heuristic match includes the received current token, or portions thereof, corresponding to at least one of the stored heuristic combinations; and
outputting a portion of the received current token that is larger than or equal to the pre-determined heuristic threshold after removing the heuristic match from the received token.

18. The non-transitory computer-readable storage medium according to claim 17, wherein the received current token is evaluated along at least one of a print modality, a visual modality and a spoken modality to determine the calculated distance metric value.

19. The non-transitory computer-readable storage medium according to claim 17, wherein the received current token is automatically generated.

* * * * *